United States Patent
Wang et al.

(10) Patent No.: US 11,236,258 B2
(45) Date of Patent: Feb. 1, 2022

(54) AQUEOUS BASED DUST CONTROL COMPOSITIONS AND METHODS

(71) Applicant: Trican Well Service Ltd, Calgary (CA)

(72) Inventors: Chuanzhong Wang, Calgary (CA); Harvey Quintero, Calgary (CA); Kewei Zhang, Calgary (CA); Bill O'Neil, Calgary (CA); Sebastian Sessarego, Calgary (CA)

(73) Assignee: Trican Well Service Ltd., Calgary (CA)

( * ) Notice: Subject to any disclaimer, the term of this patent is extended or adjusted under 35 U.S.C. 154(b) by 206 days.

(21) Appl. No.: 16/247,240

(22) Filed: Jan. 14, 2019

(65) Prior Publication Data
US 2019/0218438 A1    Jul. 18, 2019

Related U.S. Application Data

(60) Provisional application No. 62/625,686, filed on Feb. 2, 2018, provisional application No. 62/618,511, filed on Jan. 17, 2018.

(51) Int. Cl.
| | | |
|---|---|---|
| *C09K 3/22* | (2006.01) | |
| *C04B 41/00* | (2006.01) | |
| *E01H 3/00* | (2006.01) | |
| *E21B 41/00* | (2006.01) | |
| *E21F 5/06* | (2006.01) | |

(52) U.S. Cl.
CPC ............ *C09K 3/22* (2013.01); *C04B 41/009* (2013.01); *E01H 3/00* (2013.01); *E21B 41/00* (2013.01); *E21F 5/06* (2013.01)

(58) Field of Classification Search
None
See application file for complete search history.

(56) References Cited

U.S. PATENT DOCUMENTS

| | | | | |
|---|---|---|---|---|
| 4,239,660 A | * | 12/1980 | Kingry | C11D 1/835 510/295 |
| 4,428,984 A | * | 1/1984 | Shimizu | C09K 3/22 252/88.1 |
| 5,968,222 A | * | 10/1999 | Kodali | C05G 3/20 71/64.07 |
| 8,052,890 B2 | | 11/2011 | Nguyen | |
| 2005/0085407 A1 | * | 4/2005 | Oldenhove | C09K 3/22 510/504 |
| 2005/0282714 A1 | * | 12/2005 | Oldenhove | C09K 3/22 510/109 |
| 2009/0178452 A1 | | 7/2009 | Ogzewalla | |
| 2016/0251570 A1 | * | 9/2016 | Hook | C09K 8/805 507/225 |
| 2018/0098672 A1 | * | 4/2018 | Izumi | A47K 10/16 |

FOREIGN PATENT DOCUMENTS

CN    103254872 A    8/2013

* cited by examiner

*Primary Examiner* — Joseph D Anthony
(74) *Attorney, Agent, or Firm* — Blank Rome LLP

(57) ABSTRACT

Compositions and methods of reducing release of fugitive dust from particulate substrates are provided. The method involves applying a composition onto the substrate in an amount effective to reduce dust release and remain effective for an extended period of time, wherein the composition comprises an aqueous medium, a surface modifying agent, and a dispersant.

23 Claims, No Drawings

AQUEOUS BASED DUST CONTROL COMPOSITIONS AND METHODS

REFERENCE TO RELATED APPLICATIONS

This application claims priority based on U.S. Provisional Application Ser. No. 62/618,511 filed Jan. 17, 2018, and U.S. Provisional Application Ser. No. 62/625,686 filed Feb. 2, 2018, each of which are incorporated herein by reference in their entireties.

FIELD OF THE INVENTION

This invention relates generally to compositions and methods for controlling aerosolization of dust and fine materials, particularly from road surfaces.

BACKGROUND OF THE INVENTION

Without limiting the scope of the invention, its background is described in connection with existing compositions and methods for dust control. Fugitive dust, or dust suspended in air by wind action and/or human activities, is commonly created in many industrial activities including mining, hydraulic fracturing, sand blasting and forest logging, and has long been recognized as creating significant health, environmental and safety problems. For example, in strip mining it is not practical to pave roads at an excavation site. However, when trucks carrying excavated materials travel over roads they create large areas of dust that is unhealthy for workers nearby, and can damage machinery. The control of airborne silica is a constant challenge in sand casting foundries, where large volumes of sand are used in the molding processes.

Hydraulic fracturing is a practice of stimulating oil and gas production in a subterranean reservoir by injecting slurries of water and proppants (such as sand) at a very high rate into the reservoir to induce fractures. The sand is critical to prop open the fractures post injection and during the production of the well. The present style of hydraulic fracturing treatment has evolved to be an order of magnitude larger than classic treatments, with thousands of tons of sand, and with finer and lower qualities of natural sand being used. The treatment duration is now measured in days or even weeks and worker exposure to airborne silica can be for their entire eight to twelve hour work shift. The lower quality natural sands (Tier 2) that are being utilized also tend to contain more fine particles than previously used higher quality sands (Tier 1). There are multiple sources of respirable silica that are produced during a fracturing operation, such as the vents during the pneumatic transfer of sand, the gravity drop areas from belt to belt, or belt to hoppers, and the augers that add the sand to water to create the slurry to pump down the well. Inhalation of respirable crystalline silica can cause silicosis, lung cancer, pulmonary tuberculosis, airway diseases, autoimmune disorders, and other adverse health effects.

Known dust controlling methods include simply spraying water on the dust, optionally with additives such as a calcium salt (such as calcium chloride) or lignosulfonates. Oils, such as vegetable oil and petroleum oil are also used to suppress dust. Oil suppresses dust by coating the dust particles and sticking the dust particles to each other and to an underlying substrate such as an unpaved road. Problematically, oil applied as a dust suppressant on dust and/or underlying substrates is readily washed off by water or rain thus providing a very transient control measure. Oil run-off not only diminishes the dust-suppression ability of the oil, but also possibly contaminates the near-by water streams.

The present inventors undertook to develop improved dust control compositions able to reduce dust release from a substrate.

SUMMARY OF THE INVENTION

The compositions and methods described herein are applicable to control fugitive airborne dust that is released when particulate substrates such as silica sand are transferred/transported between points, or when agitated, crushed, disturbed, such when driving on top of particulates that are present on road surfaces. The compositions may be applied to road surfaces, blasting sand, sand used for hydraulic fracturing (fracing), or mining sediments/tailings.

Provided herein are methods and compositions for reducing release of fugitive dust from particulate substrates prone to dust release comprising applying a composition onto the substrate in an amount effective to reduce dust release and remain reasonably effective during intended uses of the substrate, wherein the composition comprises an aqueous medium, at least one surface modifying agent, and at least one dispersant, wherein the surface modifying agent is selected from one or more of: ammonium compounds and derivatives thereof, urea and derivatives thereof, and glycine and derivatives thereof, wherein the composition comprises 10-30 percent w/w of surface modifying agent, and 10-30 percent w/w of dispersant with the remainder being aqueous medium to 100 percent. In certain embodiments the dispersant is a glycol or polyol selected from one or more of the group consisting of: glycol ethers, glycerol, ethylene glycol and propylene glycol. In particular embodiments the dispersant is selected from 1-methoxy-2-propanol, di(propylene glycol) methyl ether and glycerol.

In certain embodiments the ammonium compound of the surface modifying agent is a quaternary ammonium compound selected from choline and derivatives thereof and tetramethylammonium chloride (TMAC) and derivatives thereof. In one embodiment, a fugitive dust composition is provided that comprises a dispersant compound containing at least one hydroxyl group, and a surface active choline compound, each in ratios from approximately 5-50 percent w/w in admixture with water to 100 percent. In certain embodiments the dispersant compound containing at least one hydroxyl group is selected from one or more of an alcohol, glycol, or glycerin. In certain embodiments the choline compound is a choline salt.

In a particular embodiment, the composition comprises 10-30 percent w/w of choline chloride and 5-50 percent w/w of 1-methoxy-2-propanol or 10-40 percent w/w of glycerol with a remainder being the aqueous medium to 100 percent.

In another embodiment, the composition comprises 10-30 percent w/w of urea and 5-50 percent w/w of 1-methoxy-2-propanol or 10-40 percent w/w of glycerol with a remainder being the aqueous medium to 100 percent.

In one embodiment the composition comprises 5-30 percent w/w of TMAC as the surface modifying agent and 5-50 percent w/w of 1-methoxy-2-propanol or 10-40 percent w/w glycerol as the dispersant with a remainder being the aqueous medium to 100 percent.

In a further embodiment the composition comprises 5-20 percent w/w of glycine as the surface modifying agent and 3-20 percent w/w of 1-methoxy-2-propanol as the dispersant with a remainder being the aqueous medium to 100 percent.

The compositions provided herein are applicable to controlling dust arising from particulate substrates prone to dust release including but not limited to dirt, sand, clay, silt, gravel, soil, mining or mineral ore, soda ash, lime, cement, alumina bauxite, dry fertilizers and any combination thereof. The compositions are applied by spraying in certain embodiments.

DETAILED DESCRIPTION OF THE INVENTION

While the making and using of various embodiments of the present invention are discussed in detail below, it should be appreciated that the present invention provides many applicable inventive concepts that can be employed in a wide variety of specific contexts. The specific embodiment discussed herein are merely illustrative of specific ways to make and use the invention and do not delimit the scope of the invention.

In certain embodiments, compositions are provided that are effective in controlling fugitive dust on road surfaces. In other embodiments the compositions are utilized in sand coaters at transload facilities for the sand used in oil and gas fracing operations. An important feature of the present compositions is that they do not reduce the intergranular coefficient of friction of sand unlike presently available like oil based products that may cause clumping and hinder movability of the sand in certain types of equipment. The new composition is also a lower cost than currently available options.

ABBREVIATIONS: The following abbreviations are used throughout this application:
CHO choline
GPC glycerophosphocholine
PCHO phosphocholine
PEO polyethylene oxide
PTDCHO phosphatidylcholine
PVA polyvinyl alcohol
TMAC tetramethylammonium chloride
TMG trimethyl glycine As used throughout, ranges are used as shorthand for describing each and every value that is within the range. Any value within the range can be selected as the terminus of the range. Unless otherwise specified, all percentages and amounts expressed herein and elsewhere in the specification should be understood to refer to percentages by weight.

For the purposes of this specification and appended claims, unless otherwise indicated, all numbers expressing quantities, percentages or proportions, and other numerical values used in the specification and claims, are to be understood as being modified in all instances by the term "about." The use of the term "about" or "approximately" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent, alternatively ±5 percent, and alternatively ±1 percent of the given numeric value provided such a deviation does not alter the end function or result of the value. Accordingly, unless indicated to the contrary, the numerical parameters set forth in this specification and attached claims are approximations that can vary depending upon the desired properties sought to be obtained by the present invention.

It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. For example, as used in this specification and the following claims, the terms "comprise" (as well as forms, derivatives, or variations thereof, such as "comprising" and "comprises"), "include" (as well as forms, derivatives, or variations thereof, such as "including" and "includes") and "has" (as well as forms, derivatives, or variations thereof, such as "having" and "have") are inclusive (i.e., open-ended) and do not exclude additional elements or steps. Accordingly, these terms are intended to not only cover the recited element(s) or step(s) but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The term "substantially" refers to an element essentially conforming to the particular dimension, shape or other word that substantially modifies, such that the component need not be exact.

For the purposes of this specification and appended claims, the term "substrate" means the surface or material, on which dust resides or is formed, and includes a quantity of particulate materials, such as a gravel and/or dirt road surfaces.

For the purposes of this specification and appended claims, the term "particulate substrate" is a substrate that tends to form dust particles when it is handled, including but not limited to dirt, sand, clay, silt, gravel, soil, mining and mineral ores, soda ash, lime, cement, alumina bauxite, dry fertilizers and the like.

The proportion of a particular substance within a mixture as provided herein is given as "weight for weight" or "weight by weight" abbreviated as w/w, as measured by weight or mass of the constituents.

For the purposes of this specification and appended claims, the term "fugitive dust" as used means a fine, dry powder capable of being carried by the air and consisting of tiny particles of earth or waste matter, which lies on or in a substrate, or which is carried in the air. "Dust" may be emitted, for example, when transporting, handling, loading and using particulate materials, or when vehicles drive over a gravel or dirt (i.e., unpaved) roads. The compositions and methods described herein are particularly useful for suppressing or controlling the emission of road dust particularly when vehicles drive on gravel, dirt or limestone-based roads that generate dust. However, they are not intended to be limited to the control of silica dust and may have use in other applications.

The present disclosure is directed to an improvement in dust control methods in a variety of industries including but not limited to construction, mining, logging, and hydraulic fracturing. In general, any industry that utilizes roads or surfaces where particulate materials and/or dust are present may be benefitted by the subject matter of the present disclosure. This disclosure relates to the use of aqueous solution of choline salts including choline chloride to suppress the emission of dust from substrates such as particulate material substrates including proppant surfaces.

In certain embodiments, the term "fugitive dust" is formed from inorganic particulate materials including fertilizers, such as disintegrating sulfur fertilizer (DSF), ammonium phosphates, calcium phosphates, ammonium nitrates, potassium nitrates, potassium chlorides, potassium sulfates, and the like.

For use in fracing operations, the size of fracing particulates (i.e., proppants) is generally between about 10-200 U.S. mesh, which is about 75 to 2000 μm (microns) in diameter. It should be understood that the size distribution of the proppants can be narrow or wide. Suitable proppants include sands, ceramic proppants, glass beads/spheres, bauxite proppants, resin coated sands, synthetic particulates and any other proppants known in the industry.

Surface modifying agents: Provided herein are compositions and methods of reducing release of fugitive dust from a particulate substrate prone to dust release comprising applying a composition onto the substrate in an amount effective to reduce dust release and remain effective for an extended period of time, wherein the composition comprises an aqueous medium, at least one surface modifying agent, and at least one dispersant, wherein the surface modifying agent is selected from one or more of: ammonium compounds and derivatives thereof, urea and derivatives thereof, and glycine and derivatives thereof. In certain embodiments the composition comprises 10-30 percent w/w of surface modifying agent, and 3-50 percent w/w of dispersant with a remainder being the aqueous medium to 100 percent.

Ammonium compounds and derivatives thereof: In certain embodiments, aqueous solutions of ammonium compounds, such as tetramethylammonium compounds (a.k.a. quaternary amines), amprolium, hexamethonium bromide, carnitine, benzyltrimethylammonium salts and benzalkonium chloride are used as surface modifying agents in compositions found to suppress the emission of dust from substrates such as particulate material substrates including proppant surfaces.

Tetramethylammonium compounds include the salts tetramethylammonium chloride (TMAC), tetraethylammonium bromide and tetraethylammonium iodide. Other quaternary ammonium compounds include distearyldimethylammonium chloride (DHTDMAC) and diester quaternary ammonium compounds including, but not limited to, diethyl ester dimethyl ammonium chloride.

In certain embodiments, the ammonium compound is the quaternary ammonium compound choline or derivatives thereof. In particular embodiments, the choline is a choline salt. In certain embodiments, an aqueous solution of choline salts, including choline chloride, acting as a surface modifying agent and a glycol ether acting as a dispersant is used in aqueous solution to suppress the emission of dust from substrates such as particulate material substrates including proppant surfaces. Without limitation, the counterion of the choline salts can be organic or inorganic. Preferred counterions include halide counterions, carboxylate counterions, nitrogen oxide counterions, phosphorus oxide counterions, sulfur oxide counterions, or mixtures or combinations thereof.

In certain embodiments, a fugitive dust composition is provided that comprises a compound containing a hydroxyl group as a dispersant, and a choline compound as a surface active agent, each in ratios from approximately 5-50% weight with weight (w/w) in admixture with water to 100%. In certain embodiments, the compound containing a hydroxyl group is selected from one or more of an alcohol, glycol, or glycerin. In certain embodiments, the choline compound is a choline salt. Other examples of choline compounds include but are not limited to free choline (CHO), glycerophosphocholine (GPC), phosphocholine (PCHO), and phosphatidylcholine (PTDCHO).

Choline (CHO) as used herein refers to a water-soluble vitamin-like trimethylammonium compound having a molecular weight (MW) of 104.17, a molecular formula $C_5H_{14}NO$, and a condensed chemical formula: $(CH_3)_3N^+CH_2CH_2OH$. CHO has solubility in water of 3.61 mg/ml (3.61 g/L). The term "cholines" refers to the class of quaternary ammonium salts containing the N,N,N-trimethylethanolammonium cation.

Choline compounds include choline salts such as for example choline chloride, choline hydroxide and choline bitartrate. Choline chloride combines a choline cation and a chloride anion and has a molecular formula $C_5H_{14}ClNO$ and a MW of 139.62. Choline chloride has a CAS No. of 67-48-1 and is very highly soluble in water with a measured solubility of 650 g/L and a calculated solubility of $1 \times 10^3$ g/L. While choline chloride is produced as a white crystalline solid, it is typically marketed as a 70-75% w/w solution in water. Choline chloride is readily biodegradable reaching 93% degradation within 14 days. The structural formula is:

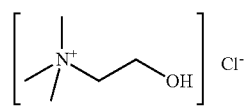

Choline can be chemically synthesized by methylation of dimethylethanolamine with methyl chloride. Choline chloride is readily mass produced including by reaction of trimethylammonium chloride with ethylene oxide in closed systems under pressure.

Phosphocholine (PCHO) is a water soluble intermediate in phosphatidylcholine synthesis and has a MW of 184.151, the molecular formula $C_5H_{15}NP_4P^+$, and the chemical formula:

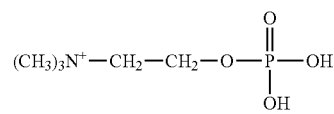

Phosphatidylcholines include a choline headgroup linked via glycerophosphoric acid to fatty acid tails.

Glycerophosphocholine (GPC) is a choline derivative having a MW of 258.223, the molecular formula $C_8H_{21}NO_6P$, and the chemical formula:

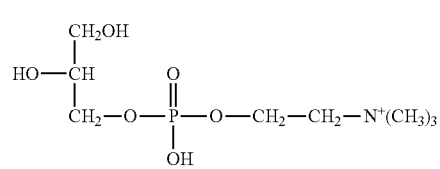

GPC has a solubility in water of 4.04 g/L.

Glycine and derivatives thereof: In certain embodiments, aqueous solutions of glycine or its derivatives, including trimethyl glycine (TMG) are used to as surface active agents to suppress the emission of dust from substrates such as particulate material substrates including proppant surfaces. Glycine is an amino acid having the chemical formula $NH_2-CH_2-COOH$. Specific examples of glycine derivatives include trimethyl glycine (TMG), triethylglycine, tripropylglycine, triisopropylglycine. Other compounds with similar structures are N,N,N trimethylalanine, N,N,N-triethylalanine, and N,N,N-triisopropylalanine.

The term "betaine" is used herein to refer to trimethyl glycine (MW 117.15), which is a compound structurally related to choline and having the molecular formula $C_5H_{11}NO_2$ and the condensed chemical formula: $(CH_3)_3N^+CH_2COOH$. Betaine hydrochloride is the hydrochloride form of betaine and is the crystalline alkaloid occurring in and derived from sugar beets and other plants. In the metabolism of many organisms, betaine is the oxidation product of choline. The term "betaine compound" as used herein refers to a class of neutral compounds that feature a positively charged cationic functional group such as a quaternary ammonium or phosphonium cation (generally: onium ions) that bears no hydrogen atom and with a negatively charged functional group such as a carboxylate group that may not be adjacent to the cationic site.

Urea and derivatives thereof: In certain embodiments, aqueous solution of urea and derivatives thereof are used to suppress the emission of dust from substrates such as road or particulate material substrates including proppant surfaces. Urea is an organic compound with chemical formula $CO(NH_2)_2$. This amide has two —$NH_2$ groups joined by a carbonyl (C=O) functional group. Urea derivatives include dimethyl urea, ethylene urea, 1,3dimethyl urea, 1,1-diethyl urea, 1,3-diethyl urea, 1,3-diallyl urea, 1,3-dibutyl urea and urea hydrochloride, Saccharides: In certain embodiments, aqueous solutions of saccharides including the disaccharide sucrose (table sugar) are added to suppress the emission of dust from substrates such as particulate material substrates including proppant surfaces.

Nonionic Polymers: In certain embodiments, aqueous solutions of nonionic water-soluble polymers such as polyethylene oxide (PEO) and polyvinyl alcohol (PVA) are added to suppress the emission of dust from substrates such as particulate material substrates including proppant surfaces.

Dispersants: The dust suppressing composition also contains one or more compounds containing at least one hydroxyl group that act as dispersants. In certain embodiments, the compound containing a hydroxyl group is selected from one or more of an alcohol, glycol, or polyol. As used herein the term "polyol" refers to organic compounds having more than one hydroxyl group. Glycols are polyols having two hydroxyl groups attached to different carbons, the simplest example being ethylene glycol. Non-limiting examples of glycols or polyols that may act as dispersants include glycol ethers such as propylene glycol methyl ether (1-methoxy-2-propanol, $C_4H_{10}O_2$) and di(propylene glycol) methyl ether ($C_7H_{16}O_3$), glycerol ($C_3H_8O_3$), ethylene glycol ($C_2H_6O_2$) and propylene glycol ($C_3H_8O_2$), each of which further function to decrease the freezing point of the composition. Without limitation of any theory, addition of the compound containing a hydroxyl group may further enhance the capability of dust suppression of the compositions.

In some instances, a composition comprising water and a choline salt such as choline chloride as a surface active agent and a glycol ether such as 1-methoxy-2-propanol as a dispersant, is applied to the particulate materials, such as proppant sands, fertilizers and the like, as they are being handled (e.g., as they are transferred from one container to another or as they are deposited onto a road surface). The amount of the choline chloride used is in the range of 0.01 w/w % to 2 w/w % of the particulate, preferably in the range of 0.03 w/w % to 0.1 w/w % of the particulate.

In some instances, the composition is applied to particulate materials, such as proppant sands, prior to being stored or transported. In the example of fracing sands in instances where the sand is coated off the fracturing work site, the coating can control dust at all potential points of release on a fracturing work site including the pneumatic transfer of sand as it arrives on location as well as belt and auger transfer to frac blenders during the frac treatment.

An aqueous solution of glycine or its derivative; of urea or its derivative; of sucrose or of a quaternary ammonium salt, may be applied in the same way with same concentration range to the substrate surfaces such as proppant surfaces.

Similarly, a composition comprising water and nonionic water-soluble polymer such as PEO and PVA, preferably further containing a dispersant such as 1-methoxy-2-propanol or glycerol, is applied to the particulate materials, such as proppant sands, as they are being handled (e.g., as they are transferred from one container to another). The amount of the polymer used is in the range of 0.005 w/w % to 1 w/w % of the sand, preferably in the range of 0.01 w/w % to 0.1 w/w % of the sand.

For suppressing road dusts, the composition may be directly applied, for example by spraying or misting, on the surface of roads.

EXAMPLE I

In one exemplary embodiment, a composition is provided that is effective in controlling fugitive dust and comprises, about 30% w/w of a 70%-75% w/w solution of choline chloride in water, and about 30% w/w of a 30% solution of 1-methoxy-2-propanol a.k.a. 1-methoxy-2-hydropropane (CAS No. 107-98-2) in water are admixed with water to 100%. In one embodiment the above referenced composition was applied to road surfaces and was effective in controlling fugitive dust without changing the intergranular coefficient of friction of sand of the road surface. In other embodiments the above referenced composition was utilized in sand coaters at transload facilities for sand used in oil and gas underground fracing operations. Again the composition was effective in controlling fugitive dust without changing the intergranular coefficient of friction of the fracing sand. By the term "effective to reduce dust release and remain reasonably effective during intended uses of the substrate" it is meant that the composition is able to control fugitive dust for a period allowing completion of the use intended. Thus for example, for fracing sands the period of intended use includes use during mixing operations such as in a hopper operation or in belt and auger transfer to frac blenders where dust is typically generated. For roads, the period allowing completion of the use intended means a period of days to weeks over which the road is traveled. Depending on environmental conditions including rain, sleet, snow, excessive dryness or heat and high winds, reapplication may be indicated. For dry granular materials such as dry fertilizers the completion of the use intended means at least through aliquoting and bagging operations.

This composition can be applied to particulates such as silica sand at concentrations from 0.4 to 1.5 L/ton, will instantly coat the particulates, and was found to significantly reduce fugitive dust from being released during agitation of the particulates.

EXAMPLE II

In one exemplary embodiment, compositions are provided that were shown by testing to be effective in controlling fugitive dust. Various compositions were compared and tested in a procedure involving coating frac sand with the compositions and then measuring the fugitive dust elaborated by the coated frac sand after agitation by pouring.

For the coating procedure, two hundred grams of 30/50 US mesh frac sand was placed in a plastic jar. Then 0.2 milliliters (mL) of an aqueous solution to be tested was added and mixed thoroughly by shaking the jar for 30 seconds. This volume of aqueous solution would calculate to an approximate volume of 1.0 liter per ton of sand to be treated. Dust level measurement was performed by placing the treated sand into a funnel, which was placed 0.5 meter above the lab bench. The treated sand was allowed to flow from the funnel into a collection beaker by gravity. The collection beaker was fitted with an outlet connected to a 0.45 μm (micron) filter and then via a plastic hose to a vacuum pump to pull air from the beaker through the filter. The generated airborne dust was collected by pulling the air from the beaker through the filter. The amount of dust was generated by flowing of the frac sand was calculated by the weight change of filter, each filter having been weighted prior to testing of the particular coating composition. The test results are shown below in TABLE I.

The dust reduction percentages shown in TABLE I demonstrate the efficacy of various additives. The aqueous materials disclosed herein provided excellent dust control performance.

TABLE I

| Ex. Additive to water | Filter weight (g) | | | Dust reduction (%) |
| --- | --- | --- | --- | --- |
| | before collection | after collection | change | |
| #1 none | 3.0863 | 3.0891 | 0.0028 | 0 |
| #2 20% choline chloride | 3.0417 | 3.0427 | 0.0010 | 64 |
| #3 20% choline chloride and 30% of a 30% w/w solution of 1-methoxy-2-propanol in water | 3.0840 | 3.0845 | 0.0005 | 82 |
| #4 20% choline chloride and 30% glycerol | 3.0850 | 3.0857 | 0.0007 | 75 |
| #5 20% urea | 3.0648 | 3.0662 | 0.0014 | 50 |
| #6 20% urea and 30% of a 30% w/w solution of 1-methoxy-2-propanol in water | 3.0697 | 3.0707 | 0.0010 | 64 |
| #7 20% urea and 30% glycerol | 3.0629 | 3.0638 | 0.0009 | 68 |
| #8 20% TMAC | 3.0644 | 3.0661 | 0.0017 | 39 |
| #9 20% TMAC and 30% of a 30% w/w solution of 1-methoxy-2-propanol in water | 3.0892 | 3.0902 | 0.0010 | 64 |
| #10 20% TMAC and 30% glycerol | 3.0729 | 3.0735 | 0.0006 | 79 |
| #11 10% glycine | 3.0909 | 3.0925 | 0.0016 | 43 |
| #12 10% glycine and 15% of a 30% w/w solution of 1-methoxy-2-propanol in water | 3.0695 | 3.0706 | 0.0011 | 61 |
| #13 10% TMAC and 15% glycerol | 3.0494 | 3.0506 | 0.0012 | 57 |

All publications, patents and patent applications cited herein are hereby incorporated by reference as if set forth in their entirety herein. While this invention has been described with reference to illustrative embodiments, this description is not intended to be construed in a limiting sense. Various modifications and combinations of illustrative embodiments, as well as other embodiments of the invention, will be apparent to persons skilled in the art upon reference to the description. It is therefore intended that the appended claims encompass such modifications and enhancements.

We claim:

1. A method of reducing release of fugitive dust from a particulate substrate prone to dust release comprising applying a composition onto the substrate in an amount effective to reduce dust release, wherein the composition consists essentially of an aqueous medium, at least one surface modifying agent, and at least one dispersant, wherein
   the surface modifying agent is selected from one or more of: ammonium compounds, urea and derivatives thereof, and glycine and derivatives thereof, and
   the composition comprises 10-30 percent w/w of surface modifying agent, and 3-50 percent w/w of dispersant with a remainder being the aqueous medium to 100 percent.

2. The method of claim 1, wherein the dispersant is a glycol or polyol selected from one or more of the group consisting of glycol ethers, glycerol, ethylene glycol and propylene glycol.

3. The method of claim 2, wherein the dispersant is selected from 1-methoxy-2-propanol, di(propylene glycol) methyl ether and glycerol.

4. The method of claim 1, wherein the ammonium compound is a quaternary ammonium compound selected from choline and derivatives thereof and tetramethylammonium chloride (TMAC) and derivatives thereof.

5. The method of claim 4, wherein composition consists essentially of 10-30 percent w/w of choline chloride and 3-50 percent w/w of 1-methoxy-2-propanol with the remainder being the aqueous medium to 100 percent.

6. The method of claim 4, wherein the composition consists essentially of 10-30 percent w/w of choline chloride and 10-40 percent w/w of glycerol with the remainder being the aqueous medium to 100 percent.

7. The method of claim 2, wherein the composition consists essentially of 10-30 percent w/w of urea and 3-50 percent w/w of 1-methoxy-2-propanol with the remainder being the aqueous medium to 100 percent.

8. The method of claim 2, wherein the composition consists essentially of 10-30 percent w/w of urea and 10-40 percent w/w of glycerol with the remainder being the aqueous medium to 100 percent.

9. The method of claim 4, wherein the composition consists essentially of 5-30 percent w/w of TMAC and 3-50 percent w/w of 1-methoxy-2-propanol with the remainder being the aqueous medium to 100 percent.

10. The method of claim 4, wherein the composition consists essentially of 5-30 percent w/w of TMAC and 10-40 percent w/w of glycerol with the remainder being the aqueous medium to 100 percent.

11. The method of claim 2, wherein the composition consists essentially of 5-20 percent glycine and 3-20 percent w/w of 1-methoxy-2-propanol with the remainder being the aqueous medium to 100 percent.

12. The method of claim 1, wherein the particulate substrate prone to dust release is a dirt, sand, clay, silt, gravel, soil, mining or mineral ore, soda ash, lime, cement, alumina bauxite and any combination thereof and wherein the composition is applied by spraying.

13. A fugitive dust control composition consisting essentially of an aqueous medium, at least one surface modifying agent, and at least one dispersant, wherein the surface modifying agent is selected from one or more of: quaternary ammonium salts, urea and derivatives thereof, and glycine and derivatives thereof, wherein the dispersant is a glycol or polyol selected from one or more of the group consisting of: glycol ethers, glycerol, ethylene glycol and propylene glycol, and wherein the composition comprises 10-30 percent surface modifying agent, and 5-50 percent dispersant with a remainder being the aqueous medium to 100 percent.

14. The composition of claim 13, wherein the dispersant is selected from 1-methoxy-2-propanol, di(propylene glycol) methyl ether and glycerol.

15. The composition of claim 13, wherein the quaternary ammonium salts selected from choline and derivatives thereof and tetramethylammonium chloride (TMAC) and derivatives thereof.

16. The composition of claim 15, wherein composition consists essentially of 10-30 percent choline chloride and 5-50 percent 1-methoxy-2-propanol with the remainder being the aqueous medium to 100 percent.

17. The composition of claim 15, wherein the composition consists essentially of 10-30 percent choline chloride and 10-40 percent glycerol with the remainder being the aqueous medium to 100 percent.

18. The composition of claim 13, wherein the composition consists essentially of 10-30 percent urea and 5-50 percent 1-methoxy-2-propanol with the remainder being the aqueous medium to 100 percent.

19. The composition of claim 13, wherein the composition consists essentially of 10-30 percent urea and 10-40 percent glycerol with the remainder being the aqueous medium to 100 percent.

20. The composition of claim 15, wherein the composition consists essentially of 5-30 percent TMAC and 5-50 percent 1-methoxy-2-propanol with the remainder being the aqueous medium to 100 percent.

21. The composition of claim 15, wherein the composition consists essentially of 5-30 percent TMAC and 10-40 percent glycerol with the remainder being the aqueous medium to 100 percent.

22. The composition of claim 13, wherein the composition consists essentially of 5-20 percent glycine and 3-20 percent 1-methoxy-2-propanol with the remainder being the aqueous medium to 100 percent.

23. The method of claim 1, wherein about 0.4 liters to about 1.5 liters of the composition is applied onto a ton of the particulate substrate.

* * * * *